(12) United States Patent
Morse et al.

(10) Patent No.: US 7,731,834 B2
(45) Date of Patent: Jun. 8, 2010

(54) METHOD FOR MIXING ADDITIVES INTO AND ELECTROLYZING CONTAMINATED LIQUIDS

(75) Inventors: Dwain E. Morse, Santa Barbara, CA (US); Wade O. Morse, Santa Barbara, CA (US); Thomas G. Matherly, Lompoc, CA (US)

(73) Assignee: Clean Water Technology, Inc., Los Angeles, CA (US)

( * ) Notice: Subject to any disclaimer, the term of this patent is extended or adjusted under 35 U.S.C. 154(b) by 1027 days.

(21) Appl. No.: 10/270,926

(22) Filed: Oct. 14, 2002

(65) Prior Publication Data

US 2004/0069716 A1 Apr. 15, 2004

(51) Int. Cl.
*C02F 1/46* (2006.01)
(52) U.S. Cl. .................. 205/742; 205/755; 205/757
(58) Field of Classification Search .............. 205/742, 205/755, 757
See application file for complete search history.

(56) References Cited

U.S. PATENT DOCUMENTS

| | | | |
|---|---|---|---|
| 2,061,197 A * | 11/1936 | Kiech | ............... 204/563 |
| 4,812,046 A * | 3/1989 | Henderickson | ............ 366/111 |
| 5,037,559 A | 8/1991 | Schmitt | |
| 5,085,753 A * | 2/1992 | Sherman | ............... 204/267 |
| 5,284,627 A | 2/1994 | Brazelton | |
| 5,426,054 A | 6/1995 | Popp et al. | |
| 6,019,825 A | 2/2000 | Greene et al. | |
| 6,426,010 B1 | 7/2002 | Lecoffre | |
| 6,669,843 B2 | 12/2003 | Arnaud | |
| 2003/0147790 A1* | 8/2003 | Kawano et al. | ............ 422/225 |

* cited by examiner

*Primary Examiner*—Arun S Phasge
(74) *Attorney, Agent, or Firm*—Denton L. Anderson; Jeffrey G. Sheldon; Sheldon Mak Rose & Anderson

(57) ABSTRACT

A method and apparatus for mixing chemical additives into contaminated liquids and electrolyzing contaminated liquids includes the positioning of a vibratable element, such as a metal spring, within a cylindrical liquid conduit. A treatment additive is introduced into the liquid upstream of the vibratable element and the liquid is directed through the conduit. The flow of the liquid in proximity to the vibratable element causes the element to vibrate and mix the liquid and the additive. The conduit and the vibratable element may be electrically charged such that the flow of the liquid in proximity to the charged and vibrating element causes an electrical charge to be imparted to the liquid. The vibration of the element also prevents fouling.

16 Claims, 3 Drawing Sheets

METHOD FOR MIXING ADDITIVES INTO AND ELECTROLYZING CONTAMINATED LIQUIDS

RELATED APPLICATION

This application claims priority from U.S. application Ser. No. 10/180,216 filed Jun. 25, 2002 which claims priority to U.S. Provisional Application Serial No. 60/300,768, filed Jun. 25, 2001.

BACKGROUND OF THE INVENTION

The present invention generally relates to the treatment of contaminated liquid, such as wastewater. More particularly, the present invention defines an innovative apparatus and method for the mixing and electrolytic treatment of contaminated liquid which may contain electrolytes, dissolved solids, suspended solids, dissolved proteins, dissolved gasses, biological microorganisms and the like, which would advantageously be treated utilizing electrocoagulation, electroflocculation or electroflotation.

It is often desirable when treating contaminated fluid, such as wastewater, to add chemical additives to remove such contamination. For example, cationic or anionic chemicals may be added in predetermined amounts and which are intended to chemically bind with certain contaminants in order to facilitate their removal from the liquid. Such chemical additives, in the form of liquids, gases, or even solids, can be added to the contaminated liquid to be treated in order to alter pH, solution ionic strength, etc., which can be used beneficially to remove the contaminants.

In the past, such mixing methods and systems have comprised adding such chemical additives to a holding tank containing the contaminated liquid and mixing the chemical additives and liquid with an electric mixer having blades or the like. Other methods have included the injection of such chemical additives to a liquid stream as it enters into a hydrocyclone, or at a later stage before the previously treated contaminated liquid is introduced into a separation or holding tank. Most such methods and systems require rather complicated sub-systems or devices to adequately mix the contaminated liquid and intended chemical additives. Some of these devices and systems require power. Others require a relatively large footprint or space. The cost, complexity, and inconvenience of such systems and devices have sometimes provided disadvantages. Accordingly there is a need for a method for mixing chemical additives into contaminated liquids which does not require power, can be retrofitted into existing systems, and is of a relatively simple and inexpensive design.

It is well known by those skilled in the art, that the passage of electrical current through an electrically conductive liquid solution provides a useful means of affecting physical and chemical behavior in the treated liquid solution. Electrolysis is a general term describing a process in which chemical and physical reactions are stimulated by the passage of electrical current through a solution of an electrolyte. Of interest in the present invention is the electrolysis of aqueous electrolyte solutions.

An electrolytic apparatus as it applies to the scope of the present invention, is defined as a physical environment in which conductive electrodes are immersed in a solution containing an electrolyte. These electrodes are connected to an electrical power supply, such that a difference of electrical potential is present between the electrodes. The solution containing an electrolyte is in intimate physical contact with the electrodes, allowing a flow of electrons between the electrodes, and through the liquid solution. The relative amount of current flow through the solution is determined by the conductivity of the solution, relative to the electrode cross-sectional area.

The number of ions present in this solution determines the conductivity of an aqueous solution. The pH of the solution is the concentration of hydrogen ions present in the solution. The pH value defines the relative acidity or alkalinity of a solution. The pH also determines the "iso-electric point" in the solution, that is, the charge potential and sign of non-ionic suspended colloidal particles in the electrolyte solution. Solutions of electrolytes may contain acids, bases, or salts, made up of electrically charged particles, or "ions". There is an equilibrium of positive and negative charges in such solutions called "cations" (+ charge) and "anions" (− charge). The splitting of compounds into cations and anions is referred to as ionization. Ionized solutions allow the transfer of electrons through the solution, when a sufficient difference of electrical potential is presented across such a solution. Thus, this mechanism allows the use of electrolytic cells comprising liquid in contact with solid conductive electrodes. A variety of electrochemical effects are stimulated by such an electron flow.

There are several methods of electrolysis which are well-known, including direct electrolysis, indirect electrolysis, electroflotation, electrocoagulation, and electroflouculation. Each will be briefly described below.

Direct Electrolysis is the electrochemical oxidation or reduction of pollutants occurring at the electrode surfaces without the involvement of other substances in the solution. Such treatment has been used for the destruction of organic pollutants such as phenols, aromatic amines, pesticides and the like, while inorganic compounds such as cynides have been desirably broken into non-toxic components. A major problem with apparatus for direct electrolysis is that the useful reaction zones are limited to the electrode interfacial areas, said areas including liquid layers no more than tens of molecules thick. Thus, a small fraction of the total liquid volume is subjected to direct electrochemical influence. The flowing liquid in such systems is isolated from treatment by boundary layer effects and diffusion time. The prior art tries to overcome these limitations by increasing electrode area in various ways, such as packed beds of conductive electrode particles, screens, surface treatments to increase surface area, and the like. Additionally, liquid flow rates are often restricted to improve the probability of the translation of microscopic volumes of the contaminated liquid into close proximity with electrode interfacial areas by thermodynamic means. Such flow rate restriction can lead to fouling, and low probability of useful treatment.

Indirect Electrolysis of pollutants relies on the electrochemical generation of reactive intermediate compounds, which then react with the targeted pollutant component. Powerful reactive agents such as hydroxyl radicals, hydrogen peroxide, ozone, hypochlorite or chlorine may be electrolytically generated. These reactive species then mix with the bulk liquid where secondary reactions occur. While these reagents, once produced, are useful in the treatment of wastewater, the overall efficiency of the treatment is still subject to the limitations of fouling, low flow rate, and poor mixing discussed in the previous paragraph.

Electroflotation utilizes dissociated oxygen and hydrogen gas volumes produced by the electrolytic process. Desirably small volumes of dissociated gas are often utilized to capture suspended hyrophobic contaminants into agglomerations of gas bubbles and contaminant particles, which then allow gravity separation of the contaminants. Secondary, non-ionic mechanisms, sometimes referred to as "field effects" can desirably effect suspended solids in waste streams. Thus, in addition to hydrophobic bubble attachment, there are colloidal effects that result from pH gradients in the liquid between electrodes, causing de-stabilization and agglomeration of colloidal suspensions.

Electrocoagulation is the destabilization of colloidal suspensions utilizing electrolytic effects. Secondary reactions resulting from electrolysis produce dissolved species, which can change pH and thus the iso-electric point of colloidal particles, breaking the suspension of colloids, and allowing their removal through subsequent attachment to charge sites on polymer additions.

Electrofloculation is an electrolytic process wherein particles in the solution are caused to be bridged or coalesce into groups as a result of intermediates generated by electrolysis, allowing their removal from the liquid stream using flotation, sedimentation, or filtration. There are many desirable electrolytic treatment methods, which may in themselves, or in combination with other treatment effect useful results.

Unfortunately, electrolytic treatment has in the past been limited in utility due to fundamental performance limitations of the prior art apparatuses and methods. Some of the problems with prior art electrolytic apparatus for wastewater treatment are:

1. Electrode fouling due to contaminants adhering to electrode surfaces, caused by low flow rates, low turbulence, and excessive electrode area. Electrode fouling lowers effective electrode area, and lowers operating efficiency.

2. Electrode blinding, due to low velocity of liquid flow, which allows the coalescence of undesirably large gas bubbles near electrodes, thus decreasing the effective cross sectional area of conductive electrolyte and lowering electrical efficiency.

3. Liquid passage plugging. Due to low liquid velocity typically employed in prior art apparatus, the low liquid velocity in the boundary layer of the electrode solid/liquid interface allows a gradual buildup of contaminant material. As the contaminants build up, the liquid path can be reduced to the extent that the liquid channel becomes plugged.

4. Low electrical efficiency in that the low liquid velocity utilized in the prior art to preclude plugging requires large electrode spacing, electrical energy utilization increases with commensurate decrease in performance. Desirable electrochemical effects of the process occur in close proximity to the electrodes, while current flow through the bulk liquid layer primarily effects undesirable heating due to IR losses in the bulk electrolyte.

5. Low mechanical mixing energy. In the liquid path of the prior art electrochemical devices, the liquid flow is primarily laminar. Turbulence generating devices utilized in some prior art devices, in an effort to improve mixing, tend to generate undesirable localized shear in the liquid, disturbing forming floccules, and lowering contaminant removal efficiency. Due to poor mixing, a large fraction of stream constituents may not be subjected to the desirable electro-chemical effects near an electrode. In electroflotation, bubbles may not optimally attach to hydrophobic waste particles. In electrocoagulation/electrofloculation, high shear may disrupt agglomerations of separable contaminants.

6. Complex mechanical configuration. Because prior art devices utilize excessive path lengths to overcome the inefficient electrode behavior, there may be multiple electrodes, packed beds, baffles, spacers, multiple seals and the like required. In addition, power distribution and bussing to individual electrodes is required. These arrangements are expensive to fabricate, assemble, and test.

7. High maintenance requirements. The complex nature of the prior art, as described above, require a higher level of maintenance, and increased downtime, increasing operating costs.

8. Large footprint requirements. The prior art being more complex and less efficient, requires more physical space for a given process throughput. This translates to a higher cost due to the ineffective use of real estate due to excessive electrode spacing.

Accordingly, there is a continuing need for an electrolyzing method and apparatus whose physical structure impedes the fouling of electrodes, and is otherwise less susceptible to plugging of liquid passage ways. What is also needed is an electrolytic apparatus with close electrode spacing, allowing higher electrical efficiency, while minimizing the undesirable blinding of the current pathway through the liquid solution. What is further needed is an electrolytic apparatus which provides desirable mixing energy throughout the liquid stream, without undesirable high shear. The apparatus should be simple and of low cost design with low maintenance requirements, and the smallest practical footprint size. The present invention fulfills these needs and provides other related advantages.

SUMMARY OF THE INVENTION

In a first preferred embodiment, the present invention resides in a method for mixing chemical additives into contaminated liquids, such as wastewater. At least one vibratable element is positioned within a liquid conduit. Typically, the conduit comprises a cylinder having a cylindrical inner space. The vibratable element comprises a coiled helix, such as a metal spring, disposed within the cylinder so that the periphery of the spring is in close proximity to an inner wall of the conduit.

A treatment additive, which may be liquid, gaseous or solid, is introduced into the contaminated liquid upstream of the vibratable element. The liquid, which is typically pressurized, is then directed to the conduit. The flow of the liquid in proximity to the vibratable element, in part due to its close proximity to the inner wall of the conduit, causes the element to vibrate and mix the liquid and the additive.

In another preferred embodiment, the vibratable element and the conduit are electrically conductive, an electrical charge being applied to these so that as the liquid flows in proximity to the element, an electrical charge is imparted to the liquid. The vibratable element is preferably a coiled spring comprised of an electrically conductive material, positioned within the cylindrical liquid conduit which has at least a portion thereof which is also electrically conductive. The outer periphery of the spring is closely spaced to the inner surface of the conduit. The conduit and spring are then electrically charged and pressurized liquid is directed into an inlet of the conduit so that the liquid must flow around the spring, or other vibratable element, causing an electrical charge to be imparted to the liquid. Due to the vibration of the spring as the liquid passes thereover, fouling of the spring or vibratable element and the conduit is prevented.

The oscillating, vibrating coil, promotes desirable mixing of the liquid, and self-cleans the liquid path of the apparatus. Additionally, the vibrating electrode in-line electrolyzer and mixer of the present invention provides improved performance, cost effectiveness, and low maintenance requirements in an innovative apparatus that treats contaminated aqueous streams. The apparatus used in the method of the present invention is mechanically simple and requires less physical space, thus lessening maintenance and footprint requirements.

Other features and advantages of the present invention will be apparent from the following detailed description, when read in conjunction with the accompanying drawings.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
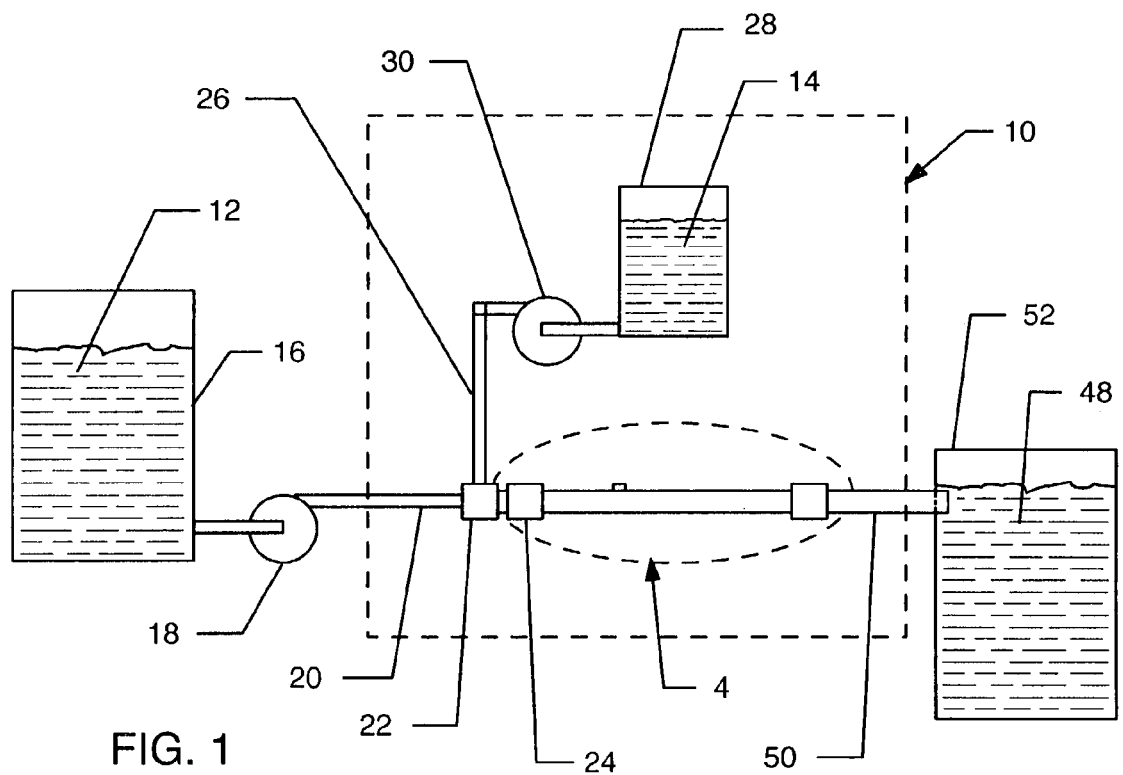
FIG. 1 is a schematic view of a fluid liquid treatment system utilizing a vibrating mixer in accordance with the present invention.

As shown in the accompanying drawings for purposes of illustration, the present invention resides in a system, generally referred to by the reference number 10 for mixing chemical additives into contaminated liquids 12, such as wastewater from industrial processes, and the like. The mixing system 10 of the present invention is intended to provide mixing of the contaminated liquid 12 with a chemical additive 14 to facilitate the removal of such contaminants from the liquid 12 in a simple and relatively maintenance-free manner.

With reference now to FIG. 1, a schematic is shown illustrating the mixing system 10 of the present invention. A liquid influent tank 16 holding contaminated liquid 12, or any another other source of contaminated liquid 12, is fluidly connected to the system 10. In a particularly preferred embodiment, a pump 18 is used to direct fluid the liquid 12 into the system 10 under pressure. The contaminated liquid 12 is directed from the pump 18 through an inlet tube 20. A liquid mixing tee 22 fluidly interconnects the contaminated liquid inlet tube 20 with a liquid conduit 24 and a chemical additive inlet tube or inlet port 26.

The chemical additive 14 can comprise any chemical or substance intended to interact with the contaminated liquid, and the contaminants therein, in order to facilitate the removal of these contaminants by separation processes and the like. For example, such chemical additives 14 can comprise powder clay, diatomaceous earth, cationic liquid solutions, anionic liquid solutions, gases, such as oxygen, carbondioxide, etc. These additives 14 are predetermined based upon the contaminants within the liquid 12. The additives 14 may also depend upon the separation methods involved, or the intended resulting mixture. Typically, such additives 14 are held in a source tank 28 having the additive inlet tube 20 extending therefrom for connection to the mixing tee 22, or even directly into the liquid contaminant tank 16. If necessary, a pump 30 is used to direct the additive 14 into the liquid stream 12.

Figure 2:
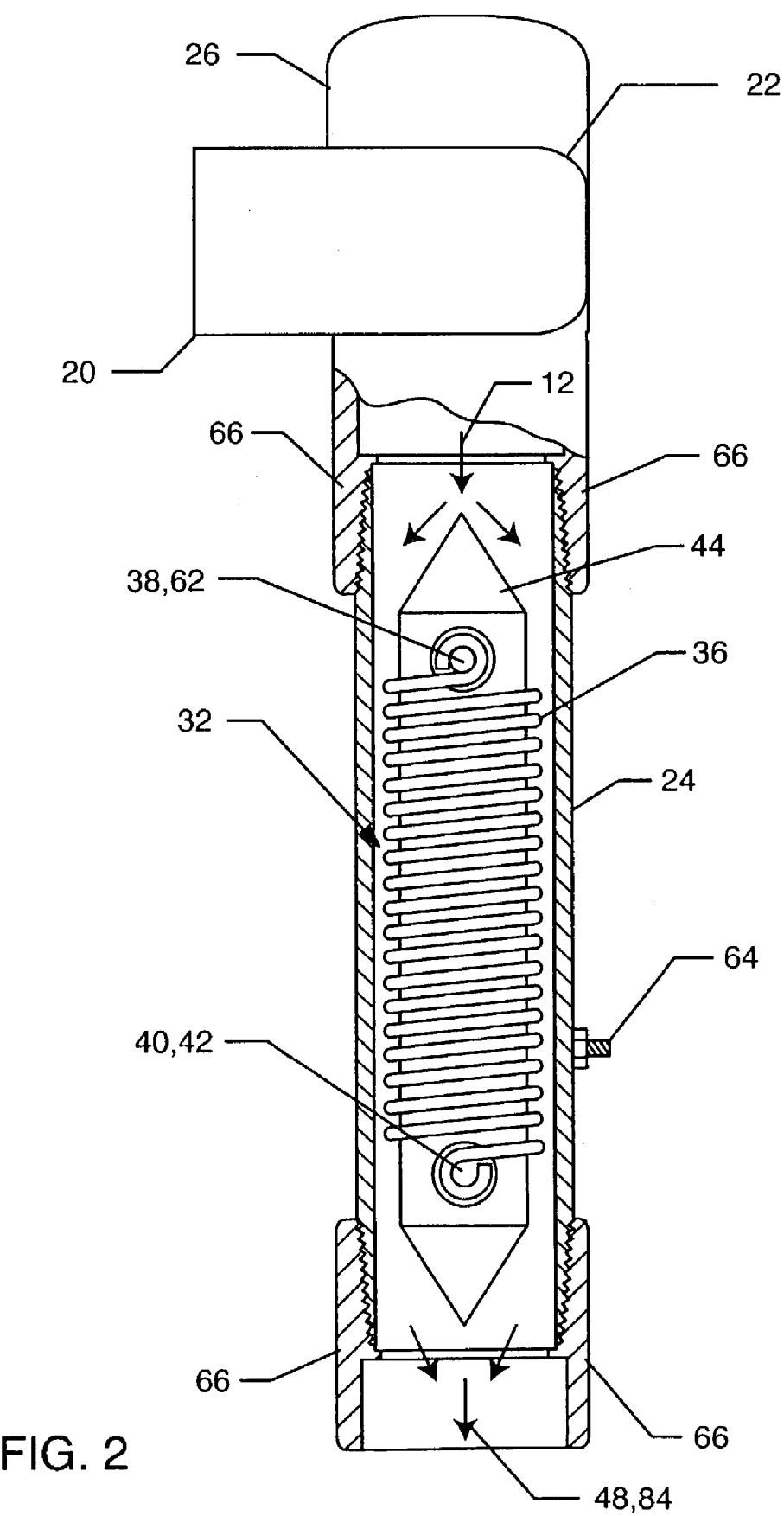
FIG. 2 is a partially sectioned view taken generally along line 2-2 of FIG. 1, illustrating a vibratable coil positioned within a conduit and used as a mixer for an electrolyzer in accordance with the present invention.

With reference now to FIG. 2, a mixing member 32 is shown within the conduit 24 in order to mix the chemical additive 14 and the contaminated liquid 12 as it passes through the conduit 24 and over the mixing member 32. The mixing member 32 is fixed in place within the conduit 24 and includes vibratable elements which vibrate and oscillate as the liquid 12 flows in proximity thereto, causing the liquid 12 and the additive 14 to be thoroughly mixed with one another. In a particularly preferred embodiment, as illustrated, the mixing member 32 includes a rigid support 34 secured to the conduit 24, such as by screws or the like. A helix or coil 36 is co-axially located inside the conduit 24 and over the support 34. The coil 36 is preferably wound in the form of an extension spring, the spring 36 at rest being fully collapsed, with little or no space between the spring windings. The coil is attached at a first attachment point 38 at one end of the support 34, and securely attached at the opposite end of the coil 36 at a generally opposite end of the support 34 at a second attachment point 40. As such, at rest, the coil 36 is suspended under tension between the support 34 and the conduit 24.

In a particularly preferred embodiment, the coil 36 to support 34 spacing is approximately 0.0625 inches. The spring coil is preferably of round wire with a diameter of approximately 0.125 inches. Preferably, the outer periphery of the spring 36 is in close proximity to an inner wall 42 of the conduit 24, such that the liquid is forced to flow around the coil 36. Preferably, the spacing between the coil 36 and inner wall 42 is approximately 0.125 inches. As described and illustrated, the inside diameter of the conduit 24 is approximately 2.125 inches, while the outside diameter of the coil 36 is approximately 1.50 inches. Thus, the cross-sectional area of the flow path through the conduit 24 where the mixing member 32 is disposed is approximately 1.093 square inches, while the cross-sectional area at the inlet of the conduit 24 is approximately 3.54 square inches. This results in a reduction of cross-sectional area of 3.245 to 1, which in turn increases liquid velocity in the area of the mixing member 32.

Preferably, the ends 44 and 46 of the support 34 are tapered to provided a smooth and non-turbulent ingress of influent contaminated liquid 12, and egress of effluent of mixed liquid 48.

In operation, and with continuing reference to FIG. 2, the influent liquid 12 enters the conduit 24, where the liquid 12 is diverted over the coiled spring 36 by the tapered end 44 of the support 34, causing the acceleration in linear velocity of the liquid 12. Upon encountering the coil 36, the liquid 12 fluid path is further restricted in cross-sectional area, causing the liquid 12 to accelerate further. The liquid 12 colliding with the end section of the coil 36 generates considerable random turbulent flow.

Due to high frictional loading caused by the rapidly flowing liquid, the coil 36 is distended in length, which stimulates random oscillation and vibration of the coil 36. This distension of the coil 36 causes the spring rate of the coil to vary over its length. Thus, the oscillatory energy stimulated by high Reynolds number flow, varies randomly in amplitude and frequency, while the coil 36 simultaneously translates randomly in transverse, longitudinal, and combinatorial modes. The vibration, oscillation, and otherwise random spacial distribution or the winding of the coil 36, or other vibratable elements of another vibratable member, coupled with mechanical pressure waves in the flowing liquid causes high mixing energy with minimal large scale shear forces. As the coil 36 is limited in its travel, it is forced into mechanical oscillation by interaction with the flowing influent liquid 12. The oscillating and vibrating coil 36 promotes desirable mixing of the liquid. Moreover, such vibrations serve to self-clean the windings of the coil 36, thus preventing fouling of the mixing member 32.

An outlet tube 50 directs the mixed chemical additive/contaminated liquid 48 into the appropriate storage tank 52 or into the next apparatus or system of the overall filtration/separation system.

Figure 3:
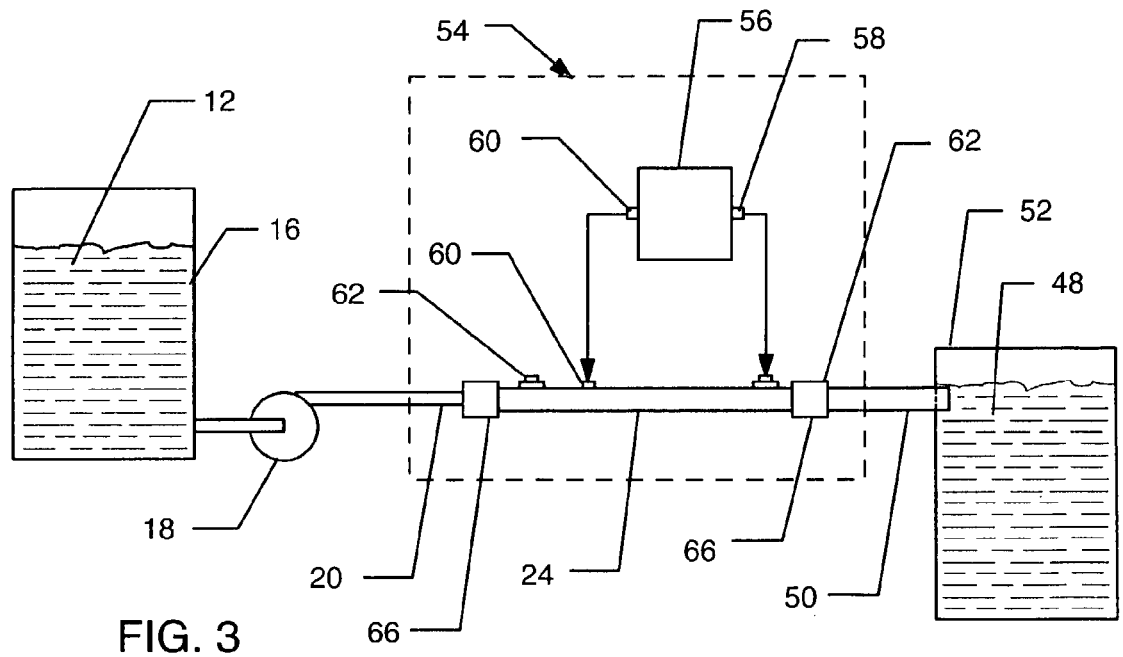
FIG. 3 is a schematic view of a liquid treatment system utilizing an in-line electrolyzer in accordance with the present invention.
Figure 4:
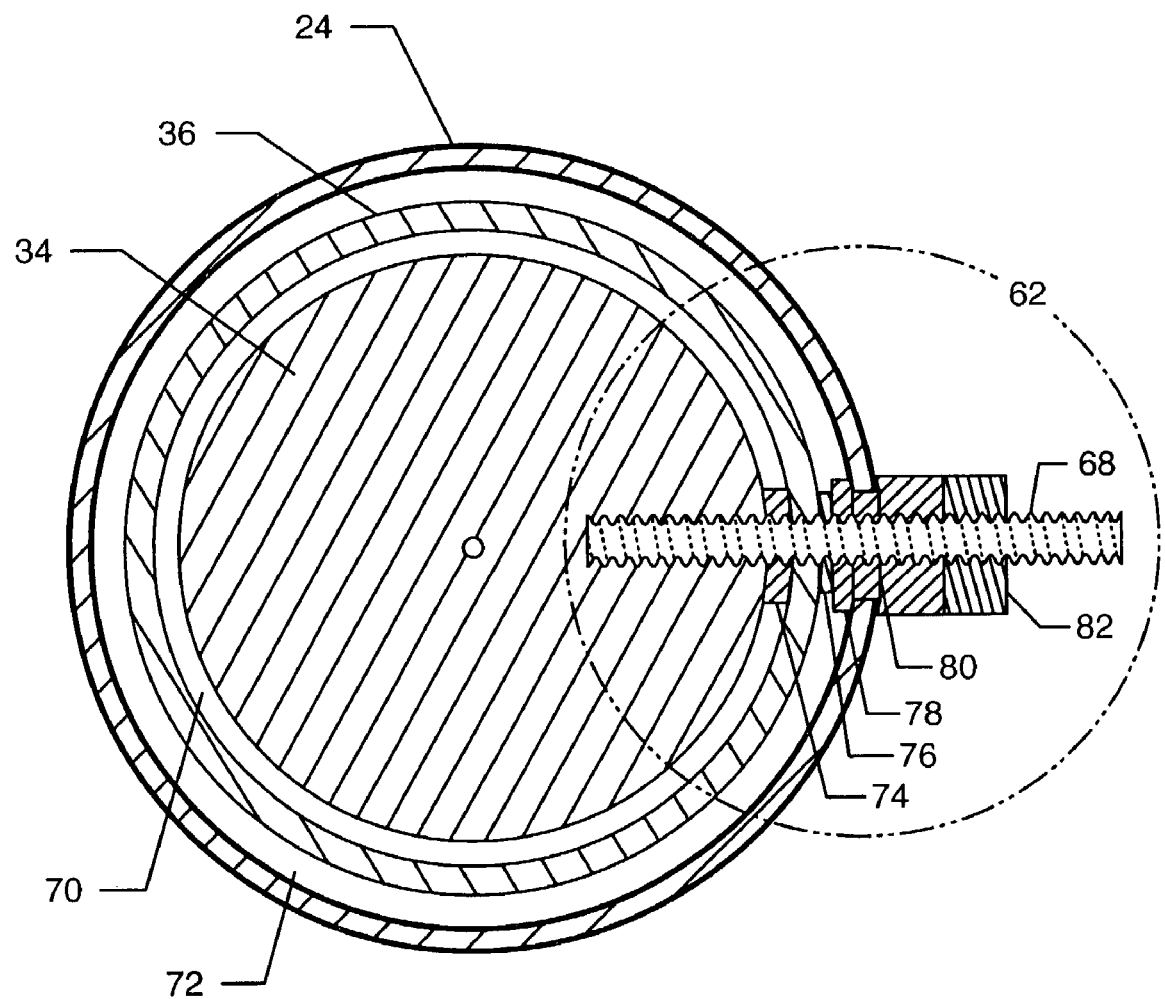
FIG. 4 is a cross-sectional view taken generally along line 4-4 of FIG. 3, illustrating a vibratable coil positioned within a cylindrical conduit and having an electrode in electrical communication therewith and insulated from the conduit.

With reference now to FIGS. 2-4, a second preferred embodiment of the present invention is illustrated incorporating an electrolyzing system 54 within the liquid path. For ease of explanation, those components and structural features which are in common with the mixing system 10 and described above will be referred to by the same reference numeral. The electrolyzing system 54 of the present invention is intended to provide electrolysis of the liquid 12 while mechanical energy is provided by the oscillating and vibrating coil 36 for most desirable mixing of the liquid 12, and self-cleaning of the mixing member 32 and liquid path of the system 54. As described above, electrolysis of liquid can be advantageously used to treat the contaminated liquid.

Referring now specifically to FIG. 3, the electrode in-line electrolyzer and mixer system 54 of the present invention is configured into an operational water treatment system. An influent liquid tank 16 containing contaminating influent liquid 12, usually contaminated water, is connected to communicate with the suction of an influent pump 18. The influent pump 18 communicates with an inlet tube 20 of a vibrating electrode in-line electrolyzer and mixing apparatus as will be described below.

An electrical power source 56 has leads 58 and 60 which are connected, respectively, to an insulated electrical feedthrough 62 extending through the conduit 24 and to the coil 36, and an external electrode terminal 64 extending from the conduit 24. The conduit 24 is at least partially comprised of an electrically conductive material, or has associated therewith an innersleeve or the like which is conductive. In a particularly preferred embodiment, the conduit 24 is comprised of threaded 300 series stainless steel pipe nipple. The conduit 24 has affixed to its outer periphery the external electrode terminal, the terminal 64 being welded or clamped in place to ensure a reliable electrical contact.

The conduit 24 is connected to the inlet and outlet tubes 20 and 50 using insulated bushings 66 which are threadably received onto the conduit 24 or securely fixed thereto by other means which would prevent liquid leakage of the system. The insulated bushings 66 enable the conduit 24 to receive an electrical charge without affecting the remaining wastewater operational system.

With reference now to FIGS. 2 and 4, the electrical terminal 62 typically comprises a bolt 68 extending through the conduit 24 and into the coil support 34. The support 34 is preferably comprised of an insulating material, such as Teflon or the like. Typically, the bolt 68 comprises the attachment point 38 or 40 of the free ends of the coil 36. Thus, electrical lead 58 can be attached to either protruding bolt 68. The coil spring 36 may be made of any suitable, conductive metal, but in the preferred embodiment, the coil 36 is constructed of a titanium wire, which, after winding, is vapor deposited with a non-porous layer of platinum.

With particular reference to FIG. 4, the electrical terminal 62 of the coiled spring 36 includes the bolt or screw 68 which serves to fix and anchor the support 34 in place within the conduit 24. The particularly preferred dimensions of the conduit 24, support 34, and spring 36 are provided above and the preferred spacing 70 between the support 34 and the coil 36 and the spacing 72 between the outer periphery of the coil 36 and the inner surface of the conduit 24, or conductive sleeve, are preferably as described above. The screws or bolts 68 are threaded into opposing ends of the support 34. The bolt 68 separates the outside periphery of the support 35 from the inside diameter of the conduit 24 by means of support spacers 74. The coil 36 is secured to the electrode bolt 68 using internally threaded contacts 76, said contacts 76 forming reliable electrical contact compressing the coil 36 and the electrode screw or bolt 68. Insulators 78 locate the coil 36 relative to the inside surface of the conduit 24. The electrode screw or bolt 68 passes through a bushing 80 which electrically insulates the screw 68 and provides a liquid-tight seal. A nut 82 may serve to secure the electrode bolt 68, and provide a sealing force to the members described above. The exposed portion of the metallic bolt 68 serves as the contact for the electrical wire terminal 58 extending from the electrical power source 56.

In operation, and referring again to FIG. 2, the influent liquid 12 enters the conductive conduit 24, which serves as a cathode, where liquid 12 is diverted into the anoid spring 36 by the tapered end 44 of the support 34. As described above, the linear velocity of the influent liquid 12 increases due to the restriction in the flow path caused by the support 34, spring 36 and the inner wall of the conduit 24. The liquid colliding with the in section of the anoid coil 36 causes the coil to oscillate or otherwise vibrate. Simultaneously, considerable random turbulent flow of the liquid is generated. As the liquid 12 flows in proximity to the windings of the coil 36, electrical energy is imparted thereto due to the close spacing of the coil 36 and inner wall of the conduit 24. Thus, the operating electrolytic cell formed by the coil 36 and conductive liquid conduit 24 provide desired electrochemical modification of the liquid 12. Simultaneously, the liquid 12 is substantially mixed, insuring that the majority, if not all, of the liquid 12 is treated. Additionally, the vibration and oscillation of the spring coil 36 prevents fouling thereof by contaminants within the liquid 12. The electrolyzed liquid 84 is then directed to a holding tank 52, or an adjoining portion of the wastewater treatment system for further processing.

Given the dimensions above, the charged spring 36 will translate no closer than 0.062 inches to the inside diameter or surface of the conduit 24 due to the support 34 limiting the travel thereof. Thus, short-circuiting of the system 54 due to contact of the spring 36 and conduit 24 is prevented.

Although several embodiments have been described in detail for purposes of illustration, various modifications may be made to each without departing from the scope and spirit of the invention. Accordingly, the invention is not to be limited, except as by the appended claims.

What is claimed is:

1. A method for mixing chemical additives into contaminated liquids, comprising the steps of:

provided a liquid conduit having a flow path with a cross-sectional flow path area;

positioning at least one vibratable element within the liquid conduit, such that the outer periphery of the at least one vibratable element is in close proximity to an inner wall of the conduit such that the liquid is forced to flow around the at least one vibratable element, the at least one vibratable element being a coiled helix disposed around a rigid central support to reduce the cross-sectional flow path area of the liquid conduit, the rigid central support having a first end and an opposed second end and being secured to the liquid conduit and the coiled helix having a first attachment point attached to the first end of the rigid central support and a second attachment point attached to the second end of the rigid central support;

introducing a treatment additive into a contaminated liquid upstream of the vibratable element, the treatment additive selected to interact chemically with the contaminants in the liquid; and directing the liquid through the conduit, whereby the flow of the liquid in proximity to the at least one vibratable element causes the element to vibrate and mix the liquid and the additive.

2. The method of claim 1, wherein the liquid is pressurized.

3. The method of claim 1, wherein the conduit comprises a cylinder.

4. The method of claim 1, wherein the coiled helix comprises a metal spring.

5. The method of claim 1, wherein the introducing step comprises introducing a liquid, gaseous, or solid chemical additive to the liquid stream.

6. The method of claim 1 wherein the coiled helix is an extension spring attached to the rigid central support under tension.

7. The method of claim 6 wherein the coiled helix is an extension spring that, when relaxed, is fully collapsed.

8. A method for electrolyzing a contaminated liquid, comprising the steps of:

positioning at least one electrically conductive and vibratable element within a liquid conduit having at least a portion thereof which is electrically conductive;

positioning a liquid flow directing support comprised of an insulative material within the at least one vibratable element;

electrically charging the conduit and the at least one vibratable element; and directing the liquid through the conduit, whereby the flow of the liquid is increased between the support and an inner wall of the conduit and forced into close proximity to the at least one vibratable element causing an electrical charge to be imparted to the liquid and also causing the at least one vibratable element to vibrate and prevent fouling of the at least one vibratable element.

9. The method of claim 8, wherein the liquid is pressurized.

10. The method of claim 8, wherein the positioning step includes positioning the at least one vibratable element within the conduit such that the outer periphery of the at least one vibratable element is in close proximity to an inner wall of the conduit such that the liquid is forced to flow around the at least one vibratable element.

11. The method of claim 8, wherein the conduit comprises a cylinder.

12. The method of claim 11, wherein the vibratable element comprises a helix coil disposed within the cylinder.

13. The method of claim 12, wherein the coil comprises a metal spring.

14. The method of claim 8, including the step of introducing a liquid, gaseous, or solid chemical additive to the contaminated liquid upstream of the at least one vibratable element.

15. A method for mixing chemical additives into and electrolyzing a contaminated liquid, comprising the steps of:

positioning a coiled spring comprised of an electrically conductive material within a cylindrical liquid conduit having at least a portion thereof which is electrically conductive such that the outer periphery of the spring is closely spaced to an inner surface of the conduit;

electrically charging the conduit and the spring;

introducing a liquid, gaseous, or solid chemical additive to the contaminated liquid upstream of the coiled spring;

pressurizing the liquid; and directing the liquid into an inlet of the conduit, whereby the flow of the liquid through the conduit and in proximity to the spring causes an electrical charge to be imparted to the liquid and also causes the spring to vibrate and prevent fouling thereof.

16. The method of claim 15, including the step of positioning a liquid flow directing support comprised of an insulative material within the spring whereby the flow of the liquid is increased between the support and an inner wall of the conduit and forced into close proximity to the spring.

* * * * *